T. G. ARNOLD.
Drop Light Joint for Gas Burners.
No. 28,548.  Patented June 5, 1860.
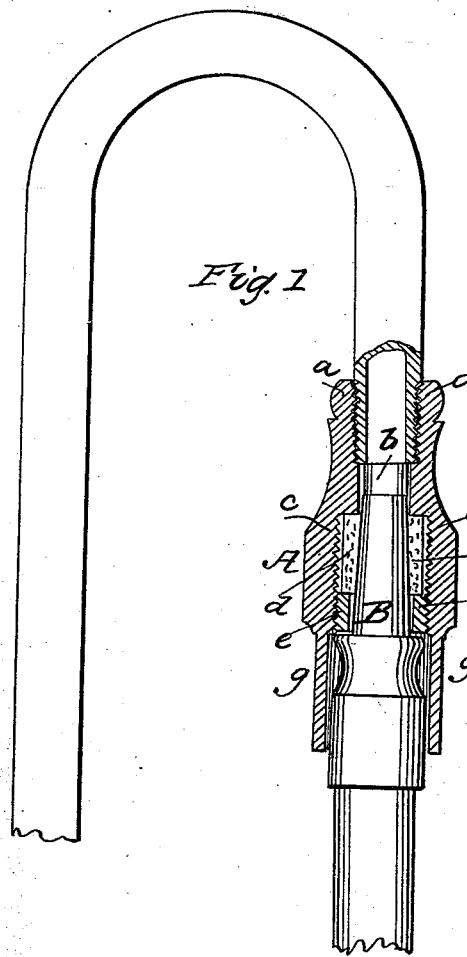
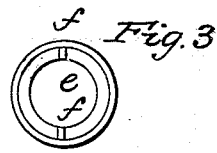
Witnesses
William Thompson
Inventor
T. G. Arnold

UNITED STATES PATENT OFFICE.

T. G. ARNOLD, OF NEW YORK, N. Y.

DROP-LIGHT JOINT.

Specification of Letters Patent No. 28,548, dated June 5, 1860.

*To all whom it may concern:*

Be it known that I, T. G. ARNOLD, of 447 Broome street, in the city, county, and State of New York, have invented a new and useful Improvement in Drop-Light Joints for Gas-Burners; and I do hereby declare that the following is a full, clear, and exact description of the same, reference being had to the accompanying drawings, forming part of this specification, in which—

Figure 1, is a central vertical section of a drop light joint constructed according to my invention representing it applied to a gas-burner. Fig. 2, is a side view of the screw ring which secures the elastic lining, and Fig. 3, is a bottom view of the same.

Similar letters of reference indicate corresponding parts in the several figures.

My invention consists in a certain construction of the socket of the joint and in a certain mode of applying the lining of cork or other elastic material whereby provision is made for the contraction or renewal of the said lining when its opening becomes worn by friction or enlarged by the heat of the burner to which it is applied and for adapting it to variations in the sizes of burners.

A, Fig. 1, represents the socket of the joint made of a single piece of cast iron or other metal having a screw thread $a$, $a$, cut in the upper part of its interior to receive the drop light pipe a portion of which is represented in the drawing in red outline. Below this screw thread there is a central bore $b$, somewhat larger than the exterior of the tip of the burner B, to which it is to be applied; and below this bore there is a larger bore in which is cut a female screw thread $c$, $c$, and the lower part is bored still larger, and larger than the exterior of the lower part of the burner B, as shown at $g$, $g$, in Fig. 1.

$d$, $d$, is the lining of cork or other elastic material made to fit snugly on the small upper part of the burner and inserted within the screw thread $c$, $c$.

$e$ is an externally screwed ring fitting into the screw thread $c$, $c$, and having notches $f$, $f$, in its lower face on opposite sides of the central opening for the reception of a screw driver by which to screw it up against the bottom of the lining $d$, for the purpose of compressing the said lining longitudinally and contracting its central opening to make it fit tightly to the burner to prevent the escape of gas between them. The central opening of the said ring is sufficiently larger than the opening in the lining $d$, that it may pass loosely over the part of the burner immediately below where the said lining fits. The advantages of constructing the joint in this manner consist in making the socket of a single piece instead of in two pieces as is usually done thereby simplifying its construction and in providing means, viz. the screwed ring $e$, for contracting the opening in the lining $d$, to compensate for wear and adapt it to variations in the sizes of burners, and for the easy renewal of the lining when worn out.

What I claim as my invention and desire to secure by Letters Patent is—

1. The construction of the socket of a drop light joint of a single piece substantially as herein described.

2. The employment in combination with the socket A, of a drop light joint for gas burners made in one piece and the elastic lining $d$, of a screw ring $e$, fitted to a screw thread inside of the said socket substantially as and for the purpose herein specified.

T. G. ARNOLD.

Witnesses:
WM. THOMPSON,
M. M. LIVINGSTON.